United States Patent
Bittinger et al.

(10) Patent No.: US 8,606,623 B1
(45) Date of Patent: Dec. 10, 2013

(54) ORGANIZATION AND PEER SET METRIC FOR GENERATING AND DISPLAYING BENCHMARKING INFORMATION

(75) Inventors: Peter Bittinger, Merion Station, PA (US); Stephen Gerard, Blue Bell, PA (US); Vincent James Mercante, Landenberg, PA (US)

(73) Assignee: Knowledgepoint 360 Group, LLC, Lyndhurst, NJ (US)

( * ) Notice: Subject to any disclaimer, the term of this patent is extended or adjusted under 35 U.S.C. 154(b) by 554 days.

(21) Appl. No.: 12/414,292

(22) Filed: Mar. 30, 2009

Related U.S. Application Data (60) Provisional application No. 61/041,173, filed on Mar. 31, 2008.

(51) Int. Cl.
*G06Q 10/00* (2012.01)

(52) U.S. Cl.
USPC ............ 705/7.39; 707/E17.001; 707/E14.044

(58) Field of Classification Search
CPC ............ G06Q 10/06393; G06Q 10/06; G06Q 10/0639; G06Q 10/00
USPC .................... 705/7.39; 707/E17.001, E17.044
See application file for complete search history.

(56) References Cited

U.S. PATENT DOCUMENTS

| | | | |
|---|---|---|---|
| 5,727,161 A * | 3/1998 | Purcell, Jr. .................... | 705/7.36 |
| 5,774,875 A | 6/1998 | Medeiros et al. | |
| 6,154,731 A * | 11/2000 | Monks et al. ................ | 705/36 R |
| 7,069,233 B2 | 6/2006 | Bracken et al. | |
| 7,519,539 B1 * | 4/2009 | Fliess et al. .................... | 705/301 |
| 7,739,141 B2 * | 6/2010 | Brown et al. ................. | 705/7.28 |
| 8,015,056 B1 * | 9/2011 | Fenstermaker et al. ..... | 705/7.39 |
| 2001/0053986 A1 | 12/2001 | Dick | |
| 2002/0013720 A1 * | 1/2002 | Ozono et al. ....................... | 705/7 |
| 2002/0099578 A1 * | 7/2002 | Eicher et al. ....................... | 705/7 |
| 2002/0161664 A1 * | 10/2002 | Shaya et al. ..................... | 705/26 |
| 2002/0194329 A1 * | 12/2002 | Alling ............................ | 709/224 |
| 2003/0004779 A1 * | 1/2003 | Rangaswamy et al. .......... | 705/10 |
| 2003/0050814 A1 * | 3/2003 | Stoneking et al. ................ | 705/7 |
| 2003/0061096 A1 * | 3/2003 | Gallivan et al. ................. | 705/14 |
| 2003/0069782 A1 * | 4/2003 | Chrisman et al. ............... | 705/10 |
| 2003/0182181 A1 * | 9/2003 | Kirkwood et al. .............. | 705/11 |
| 2003/0229526 A1 * | 12/2003 | Gallacci et al. .................... | 705/7 |
| 2004/0032420 A1 * | 2/2004 | Allen et al. .................... | 345/700 |
| 2004/0068413 A1 | 4/2004 | Musgrove et al. | |

(Continued)

OTHER PUBLICATIONS

Deros et al, A benchmarking implementation framework for automotive manufacturing SMEs, Benchmarking Journal, v13, n4,p. 396-430, 2006.*

(Continued)

*Primary Examiner* — Lynda Jasmin
*Assistant Examiner* — Octavian Rotaru
(74) *Attorney, Agent, or Firm* — Lowenstein Sandler LLP (57) ABSTRACT

The present invention relates to a system and method for generating a customized output deck, wherein the customized output deck includes organization metrics and normalization indices. The customized output deck may be used to benchmark an organization's performance within a given industry. The data utilized to create the normalization indices is gathered from a plurality of organizations however normalization of the data prohibits a connection to be determined between a specific organization and a specific piece of data. The system and method utilizes a set of parameters to populate and format a portion of the slides within the customized output deck.

18 Claims, 6 Drawing Sheets

(56) References Cited

U.S. PATENT DOCUMENTS

| | | | |
|---|---|---|---|
| 2004/0073441 A1* | 4/2004 | Heyns et al. | 705/1 |
| 2004/0073477 A1* | 4/2004 | Heyns et al. | 705/10 |
| 2004/0117240 A1* | 6/2004 | Ness et al. | 705/10 |
| 2004/0128184 A1* | 7/2004 | Bracken et al. | 705/10 |
| 2004/0169654 A1* | 9/2004 | Walker et al. | 345/440 |
| 2004/0210396 A1 | 10/2004 | Fischer et al. | |
| 2004/0210471 A1* | 10/2004 | Luby et al. | 705/10 |
| 2004/0230585 A1* | 11/2004 | Middelfart | 707/100 |
| 2005/0004832 A1* | 1/2005 | Ostergard et al. | 705/11 |
| 2005/0050099 A1 | 3/2005 | Bleistein et al. | |
| 2005/0154627 A1* | 7/2005 | Zuzek et al. | 705/10 |
| 2005/0171801 A1 | 8/2005 | Hartman | |
| 2005/0177388 A1* | 8/2005 | Moskowitz et al. | 705/1 |
| 2005/0209905 A2* | 9/2005 | Ness et al. | 705/10 |
| 2005/0209942 A1* | 9/2005 | Ballow et al. | 705/35 |
| 2005/0209943 A1* | 9/2005 | Ballow et al. | 705/35 |
| 2005/0209944 A1* | 9/2005 | Ballow et al. | 705/35 |
| 2005/0209946 A1* | 9/2005 | Ballow et al. | 705/35 |
| 2005/0278185 A1* | 12/2005 | de Nijs et al. | 705/1 |
| 2006/0020502 A1* | 1/2006 | Trout et al. | 705/9 |
| 2006/0074695 A1 | 4/2006 | Houston et al. | |
| 2006/0106843 A1* | 5/2006 | Middelfart et al. | 707/101 |
| 2006/0112110 A1* | 5/2006 | Maymir-Ducharme et al. | 707/100 |
| 2006/0178905 A1 | 8/2006 | Ayers et al. | |
| 2006/0184414 A1* | 8/2006 | Pappas et al. | 705/10 |
| 2006/0259352 A1* | 11/2006 | Hileman et al. | 705/11 |
| 2007/0174262 A1* | 7/2007 | Middelfart | 707/4 |
| 2007/0219841 A1* | 9/2007 | Fouquet | 705/8 |
| 2008/0016035 A1* | 1/2008 | Middelfart | 707/3 |
| 2008/0065415 A1* | 3/2008 | Swain et al. | 705/2 |
| 2008/0091466 A1* | 4/2008 | Butler et al. | 705/2 |

OTHER PUBLICATIONS

Greer et al, Building Sustainable Sarbanes-Oxley Management Processes, NIKU 2005 Global User Conference, 2005.*

Kyro Paula, Benchmarking as an action research process, Benchmarking Journal, 11, 1 AB-Inform p. 52, 2004.*

Maire et al, A typology of best practice for benchmarking process, Emerald, Benchmarking—An International Journal, v12, n 1, pp. 45-60, 2005.*

Sanner Leif, Benchmarking business practices in Swedish manufacturing firms, Working Paper 3, Orebo University, SE-701 82 Sweden, 2005.*

Tavana et al, Total quality index—a benchmarking tool for total quality management, Benchmarking Journal, v 10, n 6, p. 507-527, 2003.*

UMT Portfolio Manager—Builder User Training, UMT Portfolio Management Inc, Dec. 2005.*

Walkenbach, John, Microsoft Excel 2003 Bible, ISBN 0-7645-3967-1, Wiley Publishing, 2003 (selection).*

Yasin, Mahmoud M, The theory and practice of benchmarking—then and now, Benchmarking Journal, 9, 3, p. 217, ABI Inform Global, 2002.*

ARDEC Benchmarking Desk Guide, pica army, 2005.*

Bogan et al, Benchmarking for Best Practices, ISBN 0070063753, RR Donnelley Sons Company (selection), 1994.*

Brophy William, Financial Performance—Benchmarking, Chemical Market Reporter, ABIINFORM 263, 14, p. 16, 2003.*

Bruce DM, Benchmarking energy consumption and identifying opportunities for conservation, Westmount, v 101, 11, 2000.*

C Philip Ross, Energy benchmarking for glass industry, American Ceramic Society Bulletin, 76, 10,p. 85 1997.*

Camp, Robert Benchmarking The search for Industry Best Practices that Lead Superior Performance ISBN 0873890582 1989.*

Gerard Stephen, More Than a Measure, Pharmaceutical Executive, 7, p. 16, ABI INFORM, Mar. 2007.*

Hileman Michael, Best practices determine refinery pacesetter performance, Oil and Gas Journal, 99, 41, p. 44, 2001.*

Papamichael et al, Product modeling for computer-aided decision making, Automation in Construction 8, 339-350, 1997.*

Papamichael Konstantinos, Application of information technologies in building design decisions, 1998.*

Papamichael, Building Design Advisor—Automated integration of multiple simulation tools, LBNL 40591, v6 n4, 1997.*

Papamichael, The Building Design Advisor, ACADIA Conference 1996.*

Performance Monitoring and Evaluation, TIPS, USAID, No. 6, 1996.*

Resolution Integration Solutions Inc, archives org, 2002.*

RIS, Resolution Integration Solution, archives org, 2006.*

RIS, Resolution Solutions, Equipment Data Management, archives org, Dec. 1999.*

RIS, Resolution, archives org, 2000.*

Shneiderman Ben, Discovering Business Intelligence using treemap visualizations, Beyey Network, Apr. 2006.*

Solomon associates, archives org, 2001.*

Solomon associates, archives org, Nov. 2001.*

Strassman Paul A, Defining and Measuring Information Productivity, infoeconomics, 2004.*

* cited by examiner

ORGANIZATION AND PEER SET METRIC FOR GENERATING AND DISPLAYING BENCHMARKING INFORMATION

CROSS-REFERENCE TO RELATED APPLICATION

This application claims the benefit of U.S. Provisional Application No. 61/041,173 filed on Mar. 31, 2008. The entire disclosure of U.S. Provisional Application No. 61/041,173 is incorporated by reference herein.

FIELD OF INVENTION

The present invention relates to a system and method for creating a customized output deck, wherein the customized output deck contains benchmarking information.

BACKGROUND OF THE INVENTION

There are many factors that may be analyzed to assess the health of an organization. One could look to a stock price or net profits to determine the financial stability of a given organization. As used herein, the term "organization" is intended to include, but is not limited to, a company, corporation, entity, individual, or the like. Another method for assessing the vitality of an organization is to compare the performance of the organization against like organizations. A comparison between like organizations may provide a more accurate representation of an organization's performance than a stock price or net profit, which may fluctuate as a result of general market trends.

Furthermore, a comparison of like organizations may allow for industry specific characteristics to be addressed. For example, in the pharmaceutical industry where most sales are secured through sales representatives directly visiting health care providers, it may be helpful to determine how an organization's profit per sales representative compare to the industry average. Alternatively, in an industry with heavy research and development, a company's strength could be gauged based upon the amount of investment in research and development, as compared to other organizations within the industry.

However, given that this information may be valuable to competitors; many organizations maintain such sensitive information in confidence. As a result, it is often difficult to determine industry standards. Returning to the examples above, an organization may not share the amount invested in research and development or the size of their sales force for fear that transparent exposure of such information could be utilized by competitors in an adverse fashion. In instances where an industry is comprised of non-publicly traded companies lacking regulatory reporting requirements, gathering such information may be further burdensome.

Despite concerns regarding the public release of such sensitive information, many organizations realize the benefit of aggregating such information. Gathering data specific to a given industry may allow for the creation of industry benchmarks. These benchmarks may be utilized by organizations to gauge their performance within a specific industry. Returning to the examples above, a drug developer may benefit from understanding how their research and development budget compares to competitors within the pharmaceutical industry.

As a result, organizations may benefit from sharing organization specific information wherein the information can not be effectively linked to the specific source. In addition, organizations require an effective method of displaying such information.

Therefore, there is a need in the art for a system and method for aggregating industry specific information and displaying such information without divulging the specific source of the information.

SUMMARY OF THE INVENTION

Embodiments of the present invention satisfy these needs and other by providing a system and method for creating a customized output deck wherein the customized output deck includes benchmarking information relevant to a given organization. In addition, the system and related methods of the present invention (herein referred to as the 'Deck Generation System') allows for the creation of normalization indices, based on metrics relevant to a group of organizations, without divulging an individual organization's sensitive data.

Embodiments of the present invention utilize data templates to retrieve metrics from participating organizations. The Deck Generation System receives the data template and extracts the metrics included within the data template. The extracted metrics may be stored in a database. The stored metrics may be later used as the foundation for calculating normalization indices.

During the process of creating a customized output deck, embodiments of the present invention may utilize a master file, wherein master file may provide instructions regarding which resources are to be utilized during the process of creating a customized output deck. The master file may include information regarding the input deck, output parameter file, output workbook file, output deck and custom slides, utilized during the creation of a customized output deck.

Based on the master file, embodiments of the present invention may retrieve an output parameter file containing one or more parameter sets. Each parameter set may provide instructions dictating the way in which the metrics will be populated and formatted within a given slide.

The master file may also provide the identity of the input deck to be used as the template for the output deck. The Deck Generation System may duplicate the identified input deck thereby creating the output deck. Based on the output parameter file, the slides within the output deck will be customized, thereby creating a customized output deck.

Embodiments of the present invention provide for a system and method utilized to generate a customized output deck, including the steps of retrieving a master file from the database, wherein the master file identifies an output parameter file, establishing a peer set that includes a plurality of organizations, retrieving the organization metric and a peer set metrics pursuant to the output parameter file, creating a normalization index based on the peer set metrics, and generating a customized output deck according to the output parameter file, including, inserting the organization metric and the normalization index into an output deck to generate the customized output deck.

BRIEF DESCRIPTION OF THE DRAWINGS

The present invention will be more readily understood from the detailed description of exemplary embodiments presented below considered in conjunction with the attached drawings of which.

DETAILED DESCRIPTION OF THE INVENTION

The present invention relates to a method and system for aggregating, processing, and presenting information to be included in an output deck. The Deck Generation System of the present invention aggregates metrics from multiple organizations within a given industry thereby allowing an organization to benchmark their metrics against other organizations. In order to ensure anonymity among organizations that provide metrics to the Deck Generation System, the Deck Generation System displays benchmarking information as a reflection of a peer set, as opposed to identifying metrics as related to each individual organization. The term "peer set" is intended to included, but is not limited to, a group of organizations from which benchmarking data may be derived. The Deck Generation System can provide an organization with a customized output deck, wherein the customized output deck displays the organization metrics as it compares to the calculated benchmarks for a given peer set. The term "output deck" is intended to include, but is not limited to, a group of one or more slides wherein each slide may be populated and formatted with metrics and benchmark information, at the request of a given organization. The Deck Generation System may automatically populate and format one or more of the slides within the output deck. An organization may dictate the metrics included in a given slide. Certain slides within the output deck need not be populated with metrics specific to the given organization. The organization metrics will be the metrics that are benchmarked against those of the peer set. Following the population and formatting of an output deck, the output deck may be considered a customized output deck.

Figure 1:
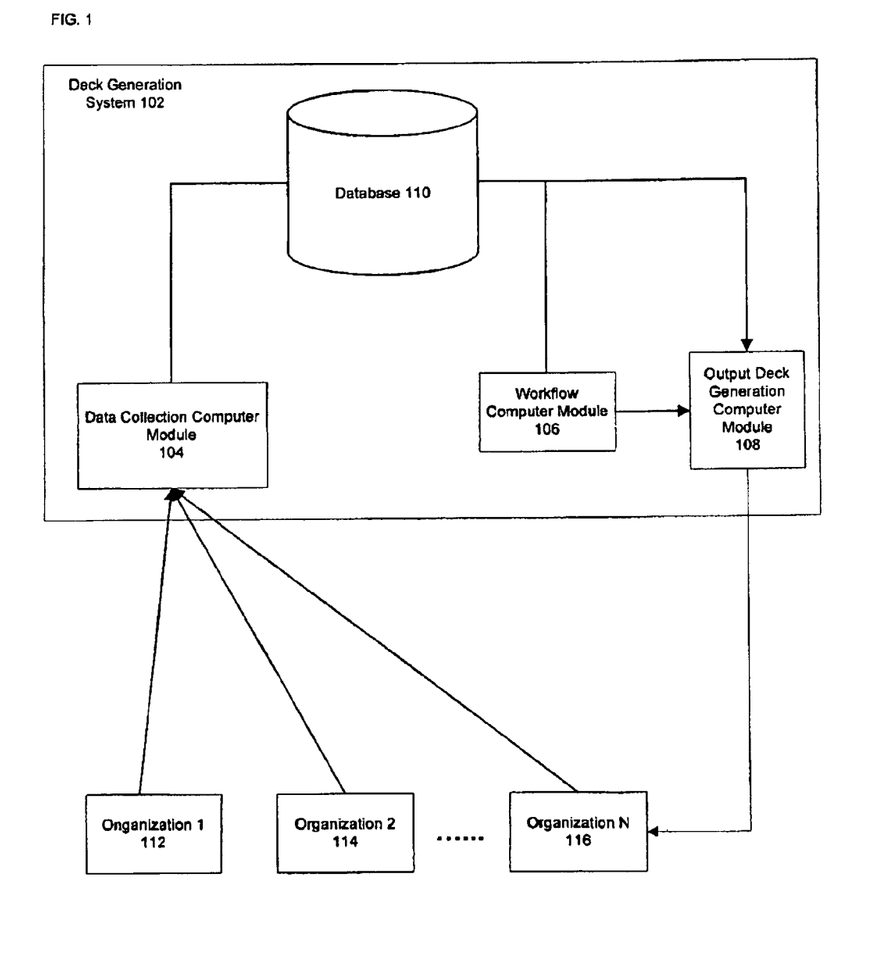
FIG. 1 depicts an exemplary communications environment including a Deck Generation System, in accordance with an embodiment of the present invention.

FIG. 1 depicts a Deck Generation System 102 according to an embodiment of the present invention. The Deck Generation System 102 is a computer-based system, accessible by one or more organizations. The term 'computer' is intended to include any data processing device, such as a desktop computer, a laptop computer, a mainframe computer, a personal digital assistant, a server, a handheld device, or any other device configured to process data.

As shown in FIG. 1, the Deck Generation System 102 includes, but is not limited to, the following components: a Data Collection Computer Module 104, a Workflow Computer Module 106, an Output Deck Generation Computer Module 108, and a Database 110. As used herein, the term 'computer module' is intended to include, but is not limited to, one or more computers configured to execute one or more software programs configured to perform one or more functions. The aforementioned components of the Deck Generation System 102 represent computer-implemented hardware and software modules configured to perform the functions described in detail below. One having ordinary skill in the art will appreciate that the components of the Deck Generation System 102 may be implemented on one or more communicatively connected computers. The term 'communicatively connected' is intended to include, but is not limited to, any type of connection, whether wired or wireless, in which data may be communicated, including, for example, a connection between devices and/or programs within a single computer or between devices and/or programs on separate computers. Each of the elements within the Deck Generation System 102 may be communicatively connected to each other.

The features and functionality of embodiment of the Deck Generation System 102 and its components are described in detail in connection with the system diagram of FIG. 1 and the process flow diagrams of FIGS. 2, 3, and 5.

As illustrated in FIG. 1, the Deck Generation System 102 is communicatively connected to organizations 122, 124, and 126 via a network (e.g., an intranet connection, the internet, etc.) For example, the organizations 122, 124, and 126 may each be companies within the pharmaceutical, telecommunications, media, agricultural, or other industry.

Figure 2:
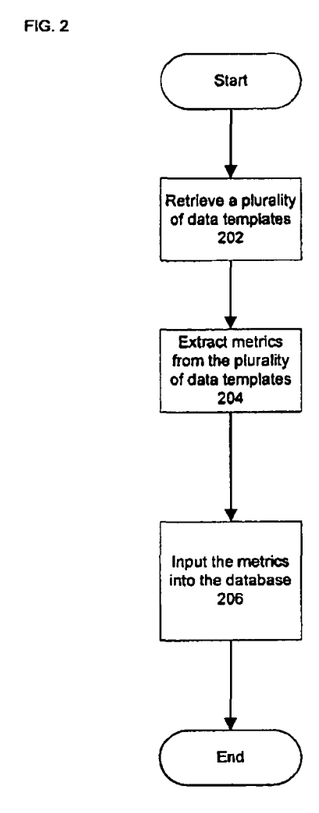
FIG. 2 illustrates an exemplary method for aggregating information, in accordance with an embodiment of the present invention.

The Data Collection Computer Model 104 is a computer module configured to receive 'data input templates' from organizations, in step 202 of FIG. 2. As used herein, the term "data input template" is intended to include, but is not limited to, a formatted document that is populated by an organization. The organization populates the document with metrics related to the organization's business practices. For example, the metrics could include an organization's field force size, number of supported brands, and environmental index. Such metrics may be utilized to create a normalization index. The term "normalization index" is intended to include, but is not limited to, a benchmarked metric that may be used to compare metrics between organizations. For example, a normalization index may reflect the average amount invested in research and development for a group of organizations.

In addition, to utilize the gathered metrics to create normalization indices, the gathered metrics may be used to benchmark a specific organization's metrics against the normalization indices. A metric collected from an organization may be compared against a normalization index to benchmark the organization's performance.

Upon receipt of a data input template, the Data Collection Computer Module 104 extracts the relevant metrics from the populated data input template, in step 204 of FIG. 2. The Data Collection Computer Module 104 may then input the extracted metrics into the Database 110, in step 206 of FIG. 2.

According to certain embodiments of the present invention, the extracted metrics may be stored in an Excel spreadsheet. In such an embodiment, a separate Excel workbook or Excel sheet may be used to store metrics related to each organization. As metrics relevant to a given organization change over time, supplemental data input templates may be submitted to the Deck Generation System 102. Providing such supplemental data input templates may increase the usefulness of the information contained in the Database 110.

The Deck Generation System 102 utilizes the aggregated metrics gathering in accordance with method 200 to generate an customized output deck for a given organization. According to the embodiment of the present invention illustrated in FIG. 1, the Workflow Computer Module 106 and Output Deck Generation Computer Module 108 facilitate the creation of a customized output deck.

The Workflow Computer Module 106 is a computer module configured to manage the process flow associated with producing a customized output deck. The Workflow Computer Module 106 first retrieves a master file, in step 302 of FIG. 3. The term "master file," is intended to include, but is not limited to, a file that provides a list of resources and instructions to be used during the creation of a customized output deck. This may include identifying a source data file, output parameter file, output work file, input deck, and custom slides. In an embodiment of the present invention consistent with the system illustrated in FIG. 1, the master file, in addition to the source data file, output parameter file, output work file, input deck, and custom slides, may be stored in the Database 110.

The term "source data file" may refer to a data file or database wherein the organization metrics and the peer set metrics are stored. This may be an Excel document or other file type capable of storing metrics. The term "peer set metrics" is intended to include, but is not limited to, an aggregation of metrics related to each member of a given peer set. For example, if the selected peer set includes organizations ACB, DEF, and GHI, and the metric at interest is research and development investment, the peer set metrics will include the research and development investment for organizations ABC, DEF, and GHI.

Figure 4:
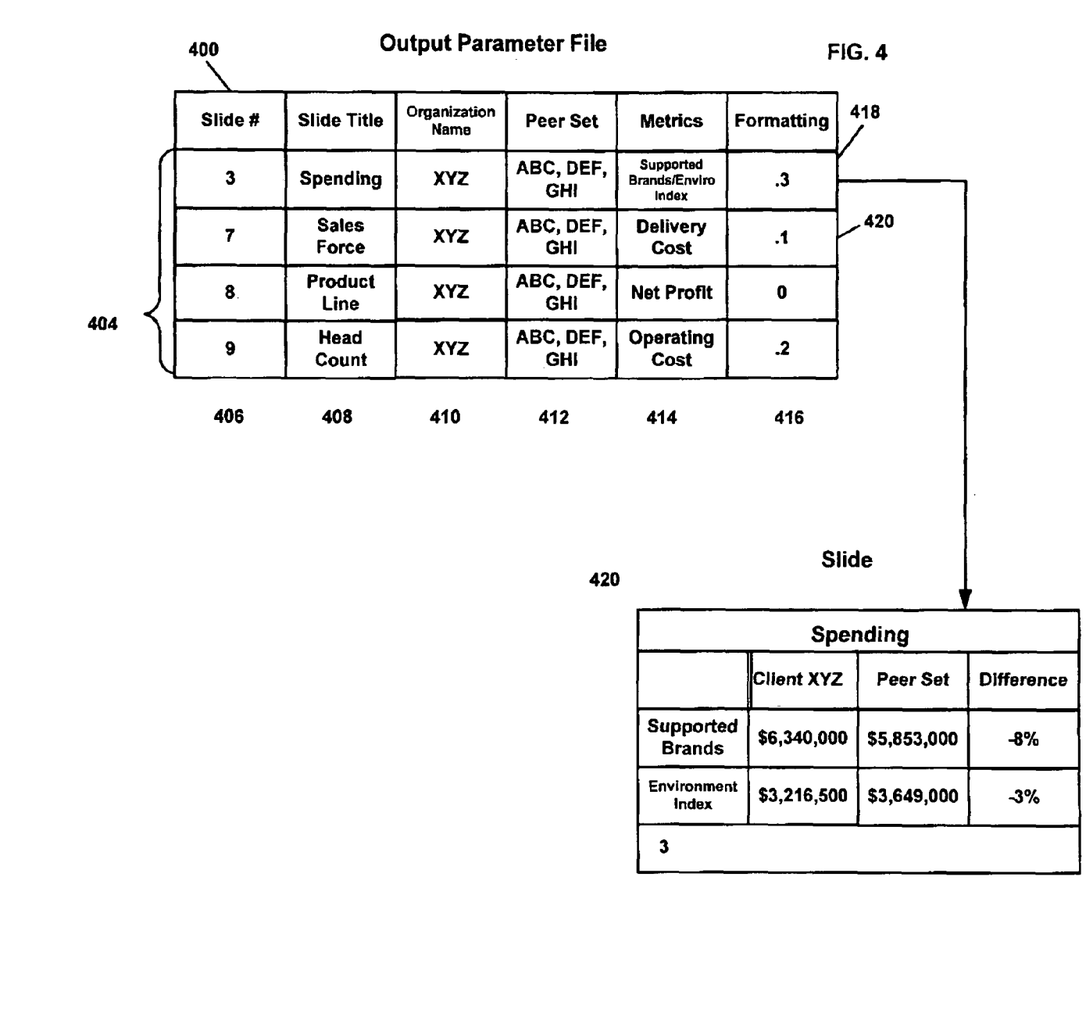
FIG. 4 illustrates an exemplary output parameter file and slide, in accordance with an embodiment of the present invention.

The master file may also identify an 'output parameter file.' The term "output parameter file," is intended to include, but is not limited to, a file that contains a list of parameter sets wherein each parameter set may dictate the way in which a slide will be populated and formatted. The parameter set may identify the metrics to be included on a given slide, as well as, the way in which the metrics will be formatted within the slide. An example of a customized output parameter file is illustrated in FIG. 4, which is discussed in greater detail below.

The master file may also identify an 'output work file.' The term "output work file" is intended to include, but is not limited to, a file, or location on a computer readable memory, where data can be stored and retrieved during the creation of a customized output deck. The output work file may act as temporary file used to store charts, graphs, pictures, or other building blocks that may be generated in the process of creating a customized output deck.

The master file may also identify an 'input deck.' The term "input deck" is intended to include, but is not limited to, a group of slides used as the template to create an output deck. The input deck may include slides that will be duplicated and later populated with metrics relevant to a given organization or peer set. In addition, the input deck may include slides that are duplicated but remain unchanged in the customized output deck.

The master file may also identify the location of one or more 'custom slides.' The term "custom slide" is intended to include, but is not limited to, a slide that has been customized for a given organization, peer set, or customized output deck, wherein additional formatting and data entry based on a parameter set may not be necessary before including the custom slide in the customized output deck. For example, a data analyst may perform certain manual calculations to create a custom chart or graph to be included in a given customized output deck. The analyst may create a custom slide based on these manual calculations wherein the custom slide is to be included in the given output deck. A custom slide may be one way to include a capability continuum, discussed in greater detail below, into an output deck.

Figure 3:
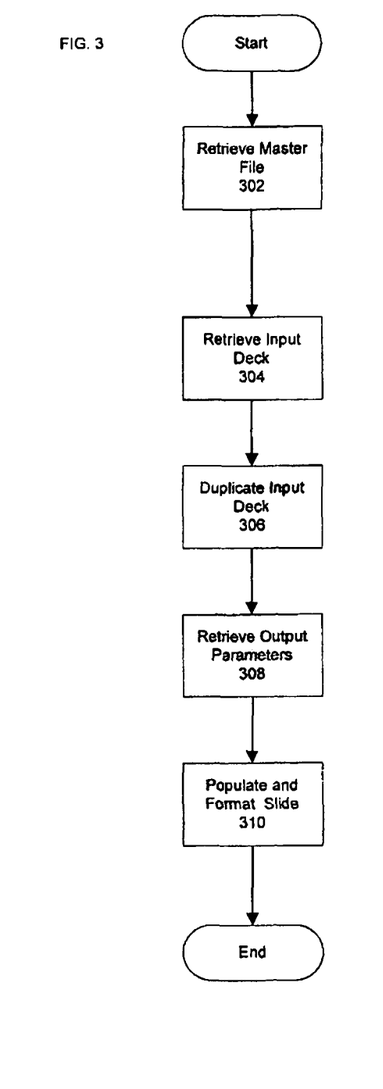
FIG. 3 illustrates an exemplary method for creating an output deck, in accordance with an embodiment of the present invention.

Following the retrieval of the master file by the Workflow Computer Module 106, in step 302 of FIG. 3, the identified input deck is retrieved by the Output Deck Generation Computer Module 108, in step 304 of FIG. 3. In certain embodiments of the present invention, the Output Deck Generation Computer Module 108 may query the Database 110 to retrieve the identified input deck.

In step 306, the Output Deck Generation Computer Module 108 duplicated the retrieved input deck, thereby creating an output deck. The output deck is created as a duplicate of the input deck to allow for the Output Deck Generation Computer Module 108 to manipulate one or more slides within the output deck without altering the original input deck. A given output deck may be customized for a particular organization. This may include, but is not limited to, populating the output deck with organization metrics and normalization indices relevant to the organization. An output deck that has been customized may be considered a customized output deck.

Following the duplication of the input deck identified by the master file, the Output Generation Computer Module 116 retrieves the output parameter file, in step 308. As described above, the output parameter file dictates the metrics to be used when populating a given slide, as well as the way which the populated slide will be formatted. The relationship between the output parameter file and a given slide is further illustrated in FIG. 4.

FIG. 4 illustrates an output parameter file 400 and a slide 402 wherein the slide 402 has been populated and formatted according to a parameter set 418 contained in the output parameter file 400. The output parameter file 400 contains a series of parameter sets 404, wherein each parameter set 404 dictates the metrics and attributes to be used when populating the corresponding slide. Column 406, tabled slide number represents the slide from within the output deck, to be manipulated based on the corresponding parameter set. Some slides within the output deck need not be manipulated. As a result, not all slides within a given output deck will have a corresponding entry in the output parameter file 400. For example, the output parameter file 400 only provides parameter sets for slides 3, 7, 8, and 9. Assuming that the corresponding output deck contains 9 slides total, slides 1, 2, 4, 5, and 6 will remain unchanged in the customized output deck. Column 408 represents the title that will be assigned to the corresponding slide. Column 410 represents the name of the organization for which the customized output deck is being prepared. Column 412 represents the organizations that will comprise the peer set. Therefore, the metrics corresponding to the organizations included in the peer set will be utilized to create a normalization index for the specified metrics. In certain embodiments of the present invention, the organization for which the customized output deck is being prepared may be included in the peer set.

In certain embodiments of the present invention where the identity of participating organizations included in the peer set is to remain anonymous, the organization receiving the customized output deck will be unaware of the members included in the peer set. The organization will simply receive information regarding the peer set as a whole, such as a normalization index, in contrast to information traceable to a specific organization. Column 414 represents the metric or metrics that will be represented on the corresponding slide. One or more metrics could be included on a given slide. For example, row 418 dictates that the metrics to be addressed will be supported brands and environmental index. As a result, the normalization indices of the supported brands and environmental index will be calculated for a peer set including organizations ACB, DEF, and GHI. These calculated normalization indices will be compared against the supported brands and environmental index metrics for organization XYZ. Column 416 represent a portion of the output parameter file 400 directed to formatting attributes that may be utilized when formatting the corresponding slide. For example, Column 416 dictates the amount of indentation that will be used when formatting the corresponding slide. Other attributes utilized when formatting a slide could be stored in the output parameter file 400.

The peer sets for each parameter set 404 includes organizations ACB, DEF, and GHI. It should be noted that the organizations included in a given peer set could vary between individual parameter sets within a single output parameter file.

The slide 402 represents a slide created based on parameter set 418. Addressing each parameter in parameter set 418, slide 3 is assigned the title "Spending," as provided for in parameter 418. Metrics for organization XYZ corresponding to supported brands and environmental index were retrieved and compared to the calculated normalization indices for supported bands and environmental index reflective of the peer set comprising organizations ACB, DEF, and GHI. As a result, organization XYZ can benchmark their performance, with respect to supported brands and environmental index, against the performance of the given peer set. As illustrated in slide 402, organization XYZ has spent $6,340,000 on supported brands while the peer set average was $5,853,000. As a result, an 8% difference exists between organization XYZ's investment and the peer set. With respect to the environment index, organization XYZ spent $3,216,500 while the peer set spent $3,649,000, on average. As a result, a 3% difference exists between the amount spent by organization XYZ and the peer set. In an embodiment of the present invention according to the Deck Generation System 102 of FIG. 1, the metrics to be used when populating the slide 402 may be stored in the Database 110.

The slide 402 displays the metrics for organization XYZ and the normalization indices for the peer set. In an alternative embodiment of the present invention, a slide may also display metrics related to a second organization. For example, the slide may display metrics related to the organization who is receiving the customized output deck, as well as second organization. The identity of the second organization may be kept anonymous or displayed on the slide.

Following the manipulation of slide 3 according to the parameter set 418, the Output Deck Generation Computer Module 108, will then populate and format slide 7 according to the parameter set 420. Given that no row exists in the output parameter file 400 corresponding to slides 4, 5, or 6, these slides will remain unchanged in the customized output deck. The Output Deck Generation Computer Module 108 proceeds through all rows in the output parameter file 400 until each corresponding slide has been populated and formatted.

Alternatively, embodiments of the output parameter file may include additional formatting parameters. Additional following formatting parameters may include, but are not limited to, header title, scale factor, redact area, slide type, slide location, slide image top location, slide image left location, and font.

As described above, in reference to FIG. 4, the output parameter file 400 may be utilized when generating the customized output deck. Returning to FIG. 3, the Output Deck Generation Computer Module 108 populates and formats slides, in step 310. FIG. 5 illustrates an exemplary process 500 for populating and formatting an output deck (step 310 of FIG. 3), according to an embodiment of the present invention.

Figure 5:
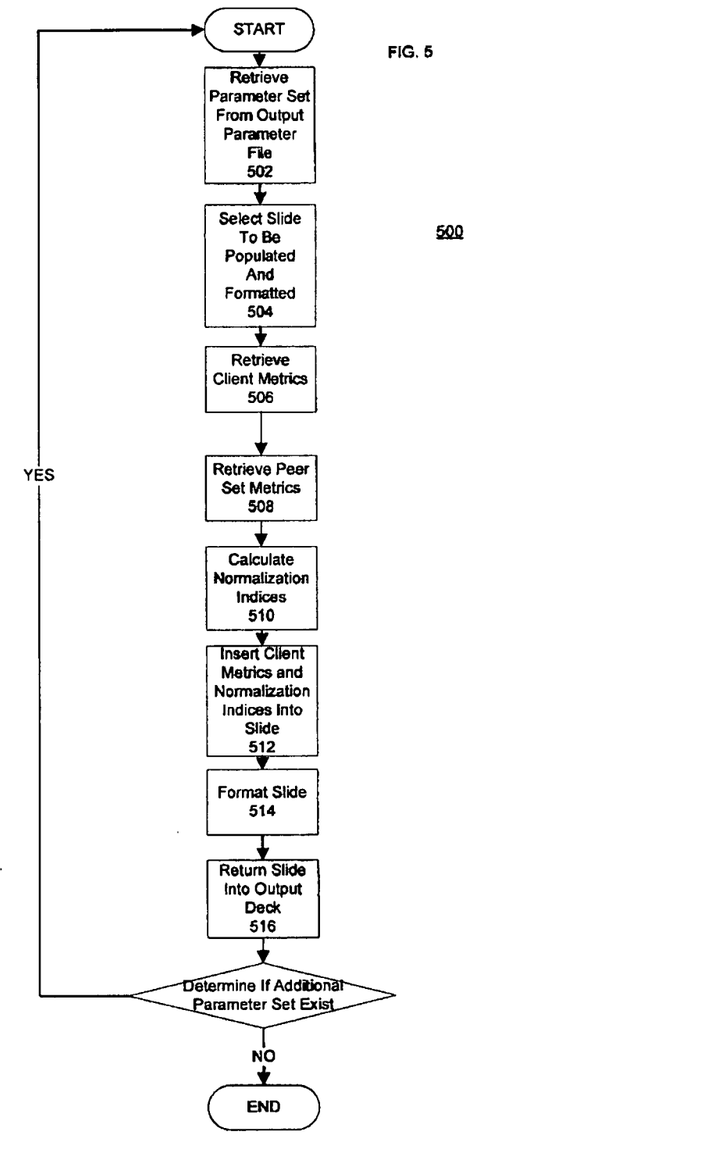
FIG. 5 illustrates an exemplary method for formatting a slide, in accordance with an embodiment of the present invention.

As shown in step 502 of FIG. 5, the Output Deck Generation Computer Module 108 retrieves a parameter set from the output parameter file 400. As described above with reference to FIG. 4, the parameter sets 404 may dictate the slide to be altered, the metrics to be used, and the way in which the corresponding slide should be formatted.

Based on the retrieved parameter set, the Output Deck Generation Computer Module 108 selects the slide to be altered, at step 504. The parameter set will identify the slide that is to be populated and formatted.

Having selected the appropriate slide, the Output Deck Generation Computer Module 108 will retrieve the organization metrics to be used when populating the slide, at step 508. Based in the metric or metrics specified in the parameter set, the Output Deck Generation Computer Module 108 may query the Database 110 to retrieve the required organization. As illustrated in FIG. 4, the parameter set 418 stated that metrics 'supported brand' and 'environmental index' would be addressed for organization XYZ. As a result, metrics for organization XYZ that correspond to 'supported brand' and 'environmental index' will be retrieved from the Database 110.

Following the retrieval of the organization metrics, the Output Deck Generation Computer Module 108 will retrieve the peer set metrics, at step 508. As with the retrieval of organization metrics in step 506, the metrics to be retrieved may be dictated by the parameter set and retrieved from the Database 110. In contrast to the retrieval of organization metrics, the peer set metrics may include data from more than one organization. For example, in FIG. 4, the peer set metrics included metrics from organizations ABC, DEF, and GHI.

Having retrieved the peer set metrics, the Output Deck Generation Computer Module 108 calculates nominalization indices, at step 510. The normalization indices could be calculated in a variety of ways. For example, a normalization index could be an average for all peer set metrics corresponding to a given topic. As illustrated in FIG. 4, the normalization index corresponding to the 'supported brands' reflects the average amount spent between the three members of the peer set per supported brands.

In certain embodiments of the present invention an organization included in a peer set may lack a metric to contribute to the peer set metrics. This could occur when an organization fails to provide a given metric when populating their data input templates. In such an embodiment wherein an organization included in a peer set lacks a metric to contribute to the peer set metrics, a 'missing value' is calculated. The term "missing value" is intended to include, but is not limited to, the average value of a given metric from organizations included in the peer set that have a metric contribute to the given peer set metric. As a result, the organization lacking the given metric will assume the missing value as their missing metric. For example, in embodiment of the present invention wherein a peer set includes four organizations, A, B, C and D, and each organization has three departments, 1, 2 and 3. If organization B failed to provide department information regarding department 2, then the total head court and aggregate spending for organization B may artificially low. As a result, one or more missing values may be calculated for the metrics associated department 2 of organization B. These missing values will be based on the average of the metric related to department 2 for organizations A, C, and D.

According to an embodiment of the present invention, normalizing peer set metrics may require the use of a temporary file. In such an embodiment, a temporary file, or output workbook, may be used as a space to perform steps executed during the process of creating a normalization index.

Given that the Output Deck Generation Computer Module 108 has retrieved the organization metrics and created the normalization indices, method 500 continues by inserting the organization metrics and the normalization indices into the selected slide. As illustrated in FIG. 4, the organization metrics and the normalization indices may be displayed side-byside to allow for easy comparison. Furthermore, additional calculations may be executed to further highlight the relationship between the organization metrics and the normalization indices. For example, slide 402 includes a 'Difference' calculation that demonstrates the percentage difference between the organization metric and the normalization index. This value could be used to quickly benchmark an organizations metrics against the peer set metrics.

At step 514, the Output Deck Generation Computer Module 108 formats a slide according to the parameter set. As described above within reference to FIG. 4, the parameter set may dictate certain formatting qualities for a given slide. An organization may customize a slide to allow for the display of a corporate logo or other formatting styles thereby providing consistency across other corporate publications. The formatted slide is then returned to the output deck, at step 516.

As described above with reference to the calculation of normalization indices, a temporary file, or output workbook, may be utilized when performing some formatting functions related to a given slide prior to inserting the slide into the output deck. According to an embodiment of the present invention, the temporary file may be used to pre-format a slide before the slide is returned to the corresponding output deck.

After populating and formatting a given slide, in steps 504-516, the Output Deck Generation Module 108 determines if additional parameter sets exist in the output parameter file, at step 518. In the event an additional parameter set exists, the method 500 returns to step 502 wherein the Output Deck Generation Computer Module 108 retrieves the subsequent parameter set and begins the task of utilizing the parameter set to populate and format the corresponding slide. In the event that no parameter sets remain, the Output Deck Generation Computer Module 108 ends the process of populating and formatting the output deck. In reference to FIG. 4, after the Output Deck Generation Computer Module 108 utilizes the parameter set 418 to alter the slide 420, the Output Deck Generation Computer Module 108 processes the parameter set 404 in order to populate and format the slide 7. The Output Deck. Generation Module 108 would proceed through the parameter sets 404 contained in the output parameter file 400 until all parameter sets have been utilized to populate and format their corresponding slide.

Returning to FIG. 3, having completed step 310 (populating and formatting one or more slides within the output deck) the method 300 has therefore successfully created a customized output deck. The customized output deck may then be delivered to the organization at step 312.

According to an embodiment of the present invention, the Output Deck Generation Computer Module 108 may insert custom slides into the output deck that need not be populated or formatted. The term "custom slide" is intended to include, but is not limited to, a slide that is not populated or formatted solely based on a parameter set. For example, a custom slide may be a slide that is manually populated and formatted. In an embodiment of the present invention where a custom slide it utilized, the Output Deck Generation Module 108 retrieves the custom slide and inserts the slide into the output deck with little or no alteration. This may be utilized in an embodiment of the present invention wherein a custom slide has been manually created and such slide is to be included in the output deck.

For example, a custom slide may include a capability continuum. The term "capability continuum" is intended to include, but is not limited to, the analysis of a given organization's performance against a set of benchmark standards. These benchmarking standards may be based on one or more normalization indices. The capability continuum may classify arr organization's performance into categories such as, well below benchmark, below benchmark, benchmark, above benchmark, well above benchmark.

Figure 6:
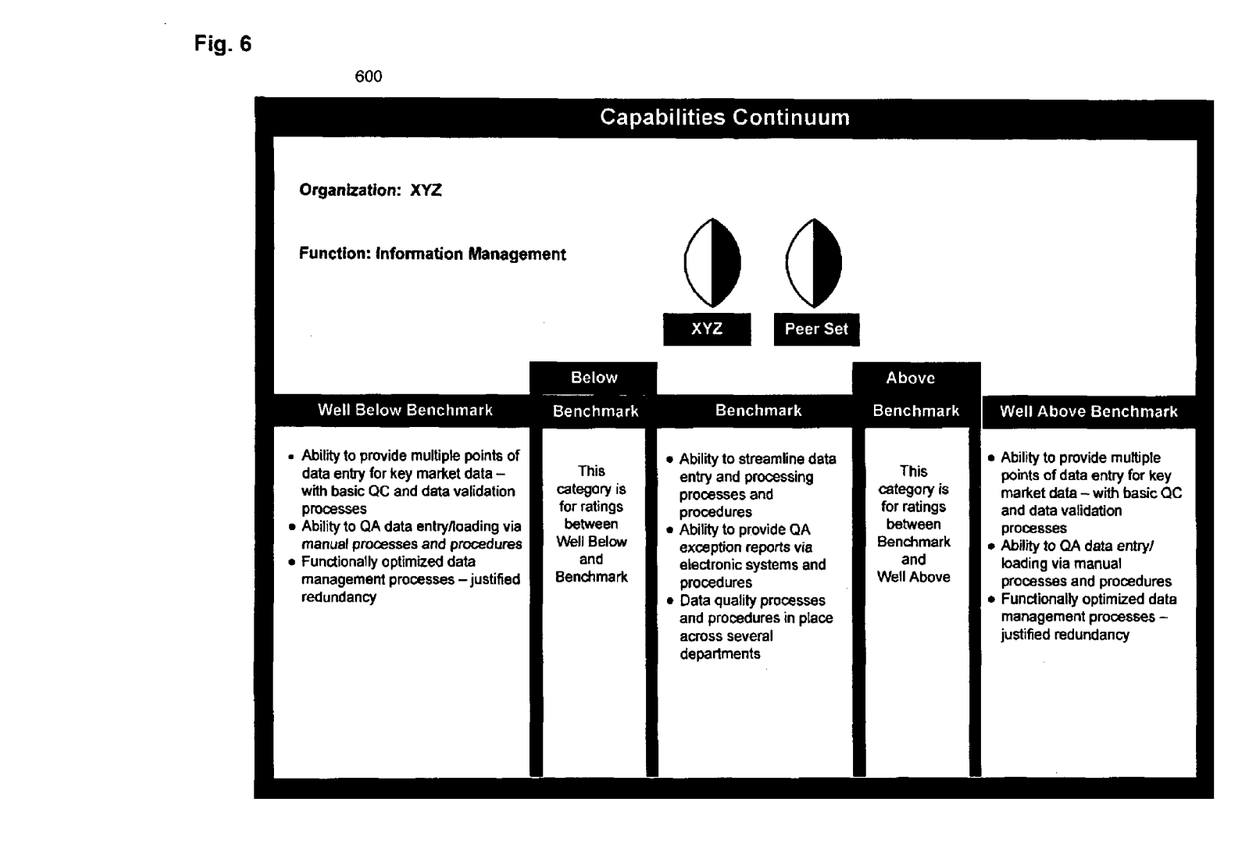
FIG. 6 illustrates a custom slide displaying a capability continuum, in accordance with an embodiment of the present invention.

FIG. 6 illustrates a custom slide 600 wherein the content of the slide is a capability continuum. As illustrated in FIG. 6, the performance of the organization has been classified into five different categories, well below benchmark, below benchmark, benchmark, above benchmark, well above benchmark. Based on gathered metrics, an analyst has classified different aspects of the organization's performance into different benchmarking categories. As illustrated in FIG. 6, certain traits related to the organization's performance have been classified as well below benchmark, benchmark, and well above benchmark. At the same time, no traits have been classified as below benchmark or well above benchmark. Wherein the normalization indices may be helpful to determine an organization's performance based on a specific metric, a capability continuum may provide a broader view of an organization's performance.

The customized output deck may be transmitted to an organization via electronic communications. This may include, but is not limited to, an email attachment or an electronic download. The customized output deck may also be delivered to an organization as a data file stored on a computer readable memory. In certain embodiments of the present invention, the customized deck may be delivered as an in-person presentation.

One skilled in the art will appreciate that the present invention can be practiced other than by the described embodiments, which are presented for purposes of illustration and not for limitation.

The invention claimed is:

1. A computerized method comprising:
    establishing, by a computer, a peer set comprising a plurality of companies in a particular industry;
    retrieving, by the computer, a master file, wherein the master file identifies a plurality of metrics of interest associated with a first company and the peer set of companies in the particular industry;
    retrieving, by the computer, an output parameter file comprising a set of format parameters defining a format of a customized output deck associated with the first company and the peer set of companies in the particular industry, wherein the set of format parameters comprises a positive algebraic indentation value;
    formatting, by the computer, a plurality of slides according to the set of format parameters by indenting the metrics of interest associated with the first company and the peer set of companies by the positive algebraic indentation value;
    retrieving, by the computer, first data relating to the indented metrics of interest associated with the first company and second data relating to the indented metrics of interest associated with the peer set of companies in the particular industry;
    calculating, by the computer, a normalization index based on the second data, wherein the normalization index represents a benchmarking metric for comparing the first company to the peer set of companies in the particular industry;
    calculating, by the computer, a percentage difference between the first data and the normalization index; and
    generating, by the computer, the customized output deck comprising the plurality of formatted slides according to the set of format parameters of the output parameter file, wherein the customized output deck comprises the indented metrics of interest associated with the first company and the peer set of companies in the particular industry, the calculated percentage difference, and the normalization index, and wherein the customized output deck preserves an anonymity of each of the peer set of companies in the particular industry.

2. The computerized method of claim 1, wherein calculating the normalization index comprises:
identifying, by the computer, third data from the second data relating to at least two metrics of interest for each of the plurality of companies of the peer set, and
calculating, by the computer, an average of normalized values for the at least two metrics of interest.

3. The computerized method of claim 1, further comprising calculating a missing value for at least a portion of the second data.

4. The computerized method of claim 1, wherein the master file identifies an input deck, and wherein the identified input deck is duplicated to create a template for the customized output deck.

5. The computerized method of claim 1, wherein generating the customized output deck further comprises:
retrieving, by the computer, a custom slide from a database, wherein the custom slide is formatted and populated prior to retrieval from the database, and
inserting, by the computer, the retrieved custom slide into the customized output deck.

6. The computerized method of claim 5, wherein the custom slide comprises a capability continuum.

7. A system comprising: a memory comprising instructions; and a processor coupled to the memory, the processor programmed to execute the instructions to perform operations comprising:
establishing a peer set comprising a plurality of companies in a particular industry;
retrieving a master file, wherein the master file identifies a plurality of metrics of interest associated with a first company and the peer set of companies in the particular industry;
retrieving an output parameter file comprising a set of format parameters defining a format of a customized output deck associated with the first company and the peer set of companies in the particular industry, wherein the set of format parameters comprises a positive algebraic indentation value;
formatting a plurality of slides according to the set of format parameters by indenting the metrics of interest associated with the first company and the peer set of companies by the positive algebraic indentation value;
retrieving first data relating to the indented metrics of interest associated with the first company and second data relating to the indented metrics of interest associated with the peer set of companies in the particular industry;
calculating a normalization index based on the second data, wherein the normalization index represents a benchmarking metric for comparing the first company to the peer set of companies in the particular industry;
calculating a percentage difference between the first data and the normalization index; and
generating the customized output deck comprising the plurality of formatted slides according to the set of format parameters of the output parameter file, wherein the customized output deck comprises the indented metrics of interest associated with the first company and the peer set of companies in the particular industry, the calculated percentage difference, and the normalization index, and wherein the customized output deck preserves an anonymity of each of the peer set of companies in the particular industry.

8. The system of claim 7, wherein calculating the normalization index comprises:
identifying third data from the second data relating to at least two metrics of interest for each of the plurality of companies of the peer set, and calculating an average of normalized values for the at least two metrics of interest.

9. The system of claim 7, further comprising calculating a missing value for at least a portion of the second data.

10. The system of claim 7, wherein the master file identifies an input deck, and wherein the identified input deck is duplicated to create a template for the customized output deck.

11. The system of claim 7, wherein generating the customized output deck further comprises:
retrieving a custom slide from a database, wherein the custom slide is formatted and populated prior to retrieval from the database, and inserting the retrieved custom slide into the customized output deck.

12. The system of claim 11, wherein the custom slide comprises a capability continuum.

13. A non-transitory computer readable storage medium comprising computer executable instructions that, when executed by a processor, cause the processor to execute operations comprising:
establishing a peer set comprising a plurality of companies in a particular industry;
retrieving a master file, wherein the master file identifies a plurality of metrics of interest associated with a first company and the peer set of companies in the particular industry;
retrieving an output parameter file comprising a set of format parameters defining a format of a customized output deck associated with the first company and the peer set of companies in the particular industry, wherein the set of format parameters comprises a positive algebraic indentation value;
formatting a plurality of slides according to the set of format parameters by indenting the metrics of interest associated with the first company and the peer set of companies by the positive algebraic indentation value;
retrieving first data relating to the indented metrics of interest associated with the first company and second data relating to the indented metrics of interest associated with the peer set of companies in the particular industry;
calculating a normalization index based on the second data, wherein the normalization index represents a benchmarking metric for comparing the first company to the peer set of companies in the particular industry;
calculating a percentage difference between the first data and the normalization index; and
generating the customized output deck comprising the plurality of formatted slides according to the set of format parameters of the output parameter file, wherein the customized output deck comprises the indented metrics of interest associated with the first company and the peer set of companies in the particular industry, the calculated percentage difference, and the normalization index, and wherein the customized output deck preserves an anonymity of each of the peer set of companies in the particular industry.

14. The non-transitory computer readable storage medium of claim 13, wherein calculating the normalization index comprises:

identifying third data from the second data relating to at least two metrics of interest for each of the plurality of companies of the peer set, and calculating an average of normalized values for the at least two metrics of interest.

15. The non-transitory computer readable storage medium of claim 13, further comprising calculating a missing value for at least a portion of the second data.

16. The non-transitory computer readable storage medium of claim 13, wherein the master file identifies an input deck, and wherein the identified input deck is duplicated to create a template for the customized output deck.

17. The non-transitory computer readable storage medium of claim 13, wherein generating the customized output deck further comprises:

retrieving a custom slide from a database, wherein the custom slide is formatted and populated prior to retrieval from the database, and inserting the retrieved custom slide into the customized output deck.

18. The non-transitory computer readable storage medium of claim 17, wherein the custom slide comprises a capability continuum.

* * * * *